(12) United States Patent
Morales (10) Patent No.: US 10,398,135 B1
(45) Date of Patent: Sep. 3, 2019

(54) FLEXIBLE FISHING LURE HAVING AN INTEGRAL RETAINER AND METHOD OF MAKING SAME

(71) Applicant: Lure Maker LLC, Phoenix, AZ (US)

(72) Inventor: Robert Morales, Phoenix, AZ (US)

(73) Assignee: Lure Maker LLC, Flagstaff, AZ (US)

( * ) Notice: Subject to any disclaimer, the term of this patent is extended or adjusted under 35 U.S.C. 154(b) by 285 days.

(21) Appl. No.: 15/254,167

(22) Filed: Sep. 1, 2016

Related U.S. Application Data (60) Provisional application No. 62/213,218, filed on Sep. 2, 2015, provisional application No. 62/252,654, filed on Nov. 9, 2015.

(51) Int. Cl.
*A01K 85/02* (2006.01)
*A01K 85/16* (2006.01)
*A01K 91/04* (2006.01)

(52) U.S. Cl.
CPC .............. *A01K 85/16* (2013.01); *A01K 85/02* (2013.01); *A01K 91/04* (2013.01)

(58) Field of Classification Search
CPC ......... A01K 85/02; A01K 85/16; A01K 91/04
See application file for complete search history.

(56) References Cited

U.S. PATENT DOCUMENTS

| | | | | | |
|---|---|---|---|---|---|
| 3,611,614 | A | * | 10/1971 | Ward ............. | A01K 85/00 43/42.24 |
| 4,672,768 | A | * | 6/1987 | Pippert ........... | A01K 85/16 43/42.09 |
| 4,791,749 | A | * | 12/1988 | Stazo ............. | A01K 85/00 43/42.24 |
| 5,490,345 | A | * | 2/1996 | Infinger .......... | A01K 85/00 43/42.24 |
| 5,491,927 | A | * | 2/1996 | Ortiz ............. | A01K 85/00 43/42.28 |
| 6,240,672 | B1 | * | 6/2001 | Huppert .......... | A01K 83/06 43/42.37 |
| 2005/0204607 | A1 | * | 9/2005 | Nichols .......... | A01K 85/00 43/42.37 |

* cited by examiner

*Primary Examiner* — Ryan A Reis
(74) *Attorney, Agent, or Firm* — Invention To Patent Services; Alex Hobson (57) ABSTRACT

A flexible plastic fishing lure has an integral retainer that is configured proximal to a front end of the fishing lure and has at least one retainer barb. The integral retainer is a harder and tougher material than the plastic used in the body of the fishing lure and is configured to seat over the jig-head barb to prevent the flexible plastic fishing lure from sliding down along the jig-head. The integral retainer has at least one retainer barb that more effectively holds the flexible plastic to the integral retainer. The integral retainer may have extension tabs that extend out radially and in some cases extend out from the flexible plastic body. The integral retainer may also have an aperture that extend along the length of the integral retainer and may be used to inject the flexible plastic into a mold.

12 Claims, 11 Drawing Sheets

PRIOR ART

PRIOR ART

Prior Art

FIG. 16

Prior Art

FLEXIBLE FISHING LURE HAVING AN INTEGRAL RETAINER AND METHOD OF MAKING SAME

CROSS REFERENCE TO RELATED APPLICATIONS

This application claims the benefit of U.S. provisional patent application No. 62/213,218, filed on Sep. 2, 2015, and U.S. provisional patent application No. 62/252,654, filed on Nov. 9, 2015, both entitled, Flexible Fishing Lure Having An Integral Retainer and Method of Making Same; the entirety of both are hereby incorporated by reference herein.

BACKGROUND OF THE INVENTION

Field of the Invention

The present invention is directed to a flexible fishing lure having an integral retainer that is configured to retain the fishing lure on a jig head, and a method of making said fishing lure.

Background

Plastic fishing lures come in many different shapes, colors and varieties and are widely used as a primary fishing lure in fishing competitions. Anglers often select plastic fishing lures that resemble bait species that are common to the area they are fishing.

Figures 1, 2:
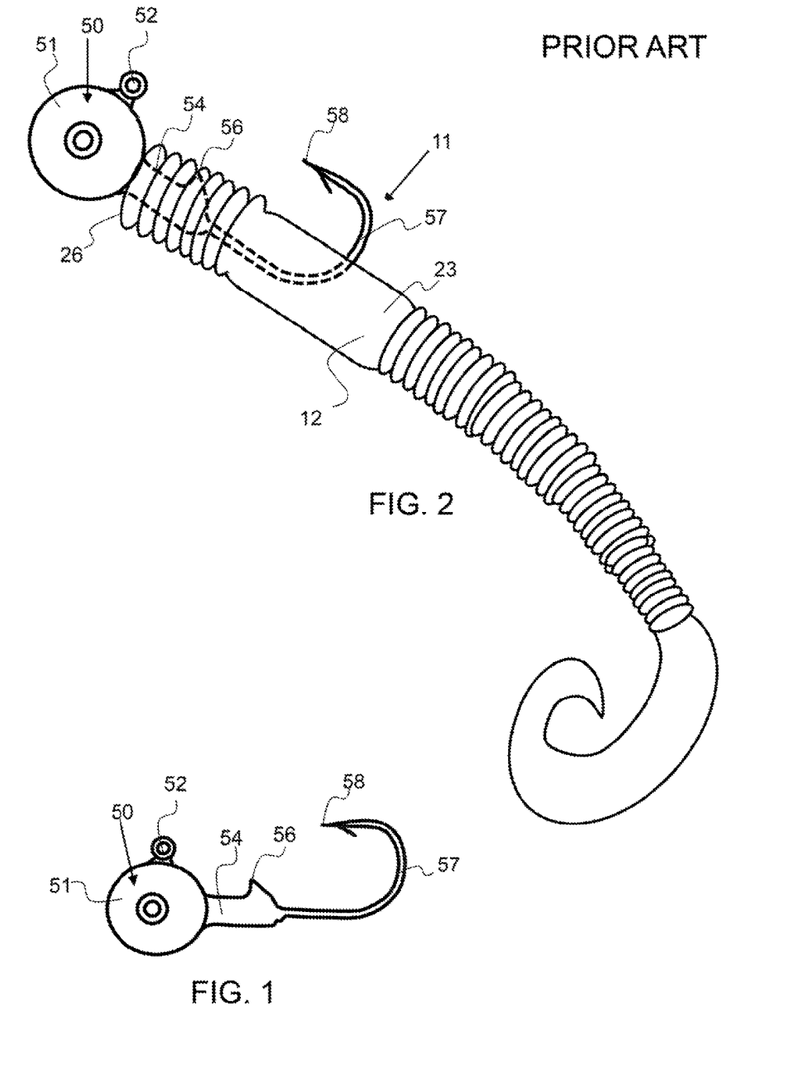
FIG. 1 shows a standard jig-head for use with flexible plastic fishing lures.
FIG. 2 shows a prior art version of a flexible plastic fishing lure attached to a jig-head, with the hook extending through the body of the flexible plastic fishing lure.
Figure 3:
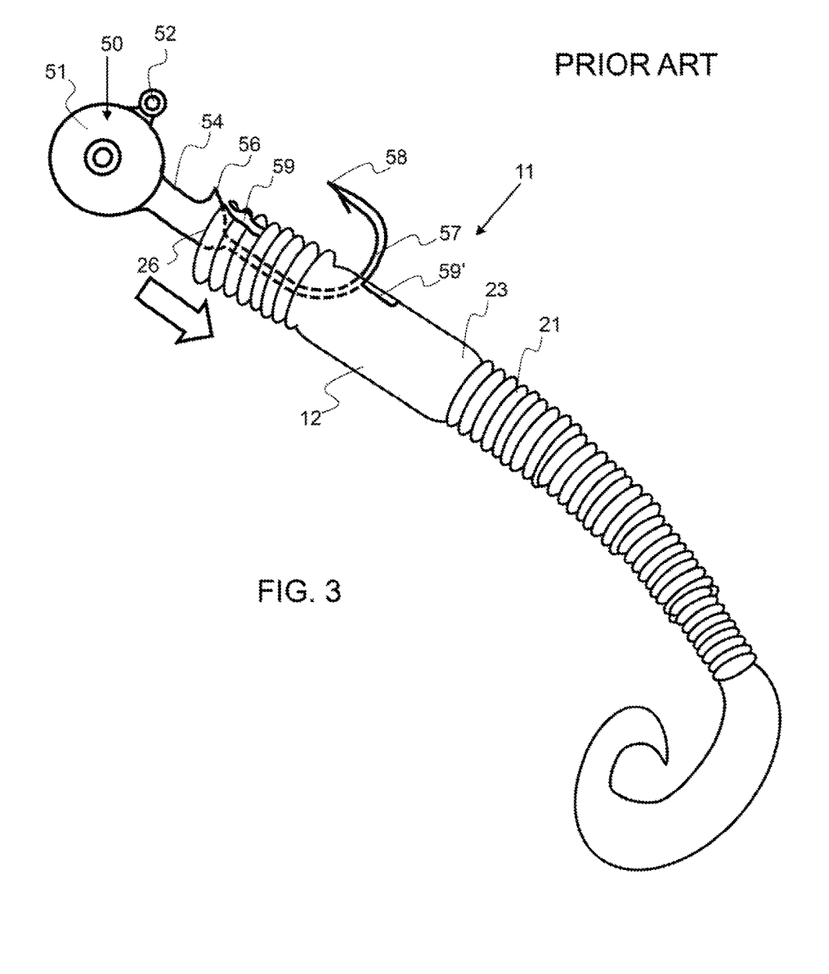
FIG. 3 shows the prior art version of a flexible plastic fishing lure shown in FIG. 2, after it has had a bite from a fish.

Plastic fishing lures routinely become displaced from an original a desired position up against the head portion of a jig-head, as shown in FIG. 2. A plastic lure is typically forced over the hook of a jig-head and up and over a jig-head barb. When a fish bites the trailing end of the flexible lure, the fish often pulls the flexible fishing lure back along the jig-head, thereby ripping the flexible plastic along the hook and the jig-head barb, as shown in FIGS. 1 to 3, prior art. The flexible plastic fishing lure may be taken off and repositioned on the jig-head after a tear but are usually compromised mechanically and end up ripping further and not staying in place on the jig-head. This is frustrating and results in frequent change outs and disposal of the plastic fishing lures.

There exists a need for a plastic fishing lure that is more durable and will stay fixed on a jig-head, even when the tail end of the plastic fishing lure is pulled during fishing. Preferably, there exists a need for a fishing lure that will fail or break under tension before it will be dislodged along the length of the jig-head.

SUMMARY OF THE INVENTION

The invention is directed to a flexible fishing lure having an integral retainer. An exemplary flexible fishing lure of the present invention comprises an integral retainer having an aperture for receiving a hook end of a jig-head. In use, a jig-head is configured with a hook extending out from the flexible body of the flexible fishing lure and a barb retained in the integral retainer or the shank of the hook extending out through the integral retainer. In an exemplary embodiment, the integral retainer is made out of a material that is harder and more durable than the soft flexible body and therefore more securely retains the jig-head to the flexible fishing lure. In addition, an integral retainer comprises at least one retainer barb that is configured to hold the flexible body portion of the flexible fishing lure to the integral retainer. In use, the flexible fishing lure will stay fixed with relationship to a jig-head attached and will not slide down along the jig-head when the trailing end of the flexible fishing lure is pulled, such as by a fish striking the lure. In an exemplary embodiment, the flexible body will break due to tension before the flexible fishing lure will be displaced, or slide, from a fixed position with respect to the jig-head.

An exemplary flexible fishing lure of the present invention comprises an integral retainer that is substantially retained within the flexible body, wherein the material of the flexible body extends substantially around the integral retainer. A flexible plastic fishing lure having an integral retainer substantially retained within the outer surface of the flexible body may comprise extension tabs that extend to or out from the outer surface of the flexible body, and/or may comprise a front surface that is the leading end of the flexible plastic fishing lure. In another embodiment, an integral retainer is completely contained within the outer surface of the flexible body.

A flexible plastic fishing lure comprises a flexible body made out of a plastic including, but not limited to, polyvinylchloride (PVC), urethane, silicone, polyethylene, copolymers and the like. Suitable flexible plastic, that is moldable by heating and injecting the plastic into a mold, is available from Calhoun Plastic and Chemical Inc., Calhoun, Ga., and M-F Manufacturing Company, Fort Worth, Tex. Other materials may be added to the flexible plastic such as stabilizers, glitter, powder scent material as described in U.S. provisional patent applications Nos. 62/213,212 and 62/242,717, hereby incorporated by reference. A flexible body of the flexible fishing lure is soft and often is formed with a tail that is configured to move or flutter as the lure is pulled through the water. This motion attracts fish and make the flexible fishing lure appear to be a live bait to fish. An exemplary flexible body of a flexible fishing lure, as described herein, is soft and has a shore A hardness of no more than about 70 and more preferably no more than about 60 and even more preferably no more than about 40. A soft flexible body is preferred as it is easier to manipulate a hook therethrough and will more readily have motion when being moved through the water.

An integral retainer is made out of a material that is harder and/or tougher than the flexible body material and may comprise a plastic or rubber. In an exemplary embodiment, an integral retainer is made of a harder plastic or a rubber that more effectively interfaces with the hook shank and/or jig-head barb to retain the flexible fishing lure in a fixed position on the jig-head. An integral retainer may have a shore A hardness of about 50 or more, about 70 or more, about 100 or more and any range between and including the ranges provided. An integral retainer may be substantially harder than the flexible body of the fishing lure, such as at least about 25% harder, or at least about 50% harder, or at least about twice as hard.

An integral retainer may have a front portion that is configured as a stop to prevent a jig-head barb from sliding forward with respect to the flexible fishing lure when the flexible fishing lure is put in tension from the trailing end. An integral retainer may have an aperture to allow the hook and/or barb of a jig-head to more easily slide down along the length of the flexible fishing lure. In addition, an integral retainer may comprise a barb slot that is configured to allow the jig-head barb to more easily fit through the front surface and/or portion of the integral retainer.

An exemplary integral retainer comprises at least one retainer barb that is configured to retainer the flexible body to the integral retainer. A flexible fishing lure as described herein may have one, two, three or more retainer barbs configured along the length of the integral retainer. A retainer barb comprises an enlarged portion that is proximal to the leading end of the flexible fishing lure and a truncated end that is more proximal to the trailing end of the flexible fishing lure. An exemplary barb has a barb-retainer surface, or surface that is substantially perpendicular to a length axis that extends through the flexible fishing lure. This perpendicular surface grabs and retains the flexible body portion as it provides an area of contact that resists the body portion from sliding along the length.

An integral retainer may comprise a retainer extension or a connecting portion between a retainer barb and a front portion. In addition, an integral retainer may comprise an extension portion between a first and second retainer barb. A retainer extension and/or extension portion may be cylindrically shaped with the aperture extending therethrough or may be one of more discrete posts or walls. A discontinuous extension portion or retainer extension may facilitate configuring a jig-head to the flexible fishing.

A flexible fishing lure having an integral retainer may accommodate any number of different sized and shaped jig-heads. A flexible fishing lure may have a length from a leading end to a trailing end of about 25 cm or more, about 10 cm or more, about 5 cm or more and about 3 cm or more and any range between and including the lengths provided. Larger flexible fishing lures may be used for larger fish species or ocean fishing, whereas smaller flexible fishing lures may be used for smaller fish, such as crappie, trout and the like. An integral retainer may be configured with a length that is any portion of the length of the flexible fishing lure, such as about 50% or less, about 25% or less, or about 10% or less, about 5% or less, and any range between and including the length portions provided. Long worm or eel shaped lures may have an integral retainer with a length that is less of the overall length of the flexible fishing lure, for example.

An exemplary flexible fishing lure comprises one or more extension tabs that may be used to locate and fix the integral retainer within a fishing lure mold. In an exemplary embodiment, first and second extension tabs are configured on opposing sides of the integral retainer and extend out radially form the integral retainer. With retainer tabs extending form opposing sides, an integral retainer may be positioned within a fishing lure mold having tab cavities to receive the first and second extension tabs. The extended ends of the extension tabs may be configured within the outer surface of the flexible body, extend to the outer surface, or extend out from the outer surface of the flexible body. An angler may be able to quickly determine that the flexible fishing lure has an integral retainer when the extension tabs extend to the outer surface or out from the outer surface. The flexible plastic is soft and an angler may also be able to determine that the flexible fishing lure has an integral retainer by pinching or squeezing the lure. In an embodiment where the extension tabs extend to the outer surface or out from the outer surface, the extension tabs may provide an indication of orientation for the insertion of a jig-head with the jig-head barb configured to extend substantially 90 degrees from the extension tabs, or aligned with the extension tabs, for example. An exemplary integral retainer may comprise a barb slot that is oriented to receive the jig-head bard, for example.

A flexible fishing lure, as described herein may be any suitable color and may be any suitable size and shape including, but not limited to, worm, grub, crayfish, fish, eel, frog, and lizard. A flexible fishing lure may have glitter or flakes that are incorporated therein to reflect light in an effort to attract fish.

In an exemplary embodiment, a flexible fishing lure as described herein, comprises an integral retainer that is configured along the length of the lure body, between a first and a second end of the lure. The integral retainer comprises an elongated retainer portion that extends along the length of the lure body and in an exemplary embodiment, does not extend to the ends of the lure body. The integral retainer may comprise a tab that extends from the elongated retainer portion and out from the lure body to allow attachment of a hook. The tab may have an aperture to facilitate hook attachment. The elongated retainer portion may have one or more enlarged retainer portions that will enhance the durability of the integral retainer and fishing lure. The enlarged retainer portions will prevent movement of the integral retainer with respect to the plastic lure body. The enlarged retainer portions may be plug shaped, disc shaped, ring shaped, toroid shaped, barb shaped or barbs and the like. The enlarged portions are larger in radial dimension than the elongated retainer portion. For example, the elongated retainer portion may be rod shaped and the enlarged retainers may be larger than the diameter of the rod. The enlarged retainers may be configured on the ends of the elongated retainer portion or along the length, such as between the tab and the first or second end of the elongated retainer portion. In an exemplary embodiment, the length of the integral retainer is no more than about 60%, or no more than about 40%, of the length of the flexible lure body. The length of the integral retainer may however be at least 10%, or at least 20%, or at least 30% of the length of the flexible lure body. An exemplary integral retainer configured along the length of the flexible lure body may be substantially harder and more durable than the material of the flexible lure body. The lure body may be a very soft plastic to allow flexing and natural movement whereas the integral retainer may be more rigid to ensure durability and retention within the flexible lure body. The integral retainer may be a hard plastic, a thermoset material, a composite material and the like. The integral retainer may be harder than the body portion of the plastic lure, as determined by shore hardness, such as shore A or shore OO. A plastic worm body for example may have a shore OO hardness of about 30 and an integral retainer may have a shore A hardness of about 40 to 80, which is much harder than the plastic worm body. An integral retainer may be substantially harder than the flexible body of the fishing lure, such as at least about 25% harder, or at least about 50% harder, or at least about twice as hard.

The elongated retainer portion of the integral retainer having a tab configured along the length may provide some spring or spring like motion to the lure, wherein the elongated retainer portions have a memory or stiffness that causes the ends of the flexible lure body to rebound more vigorously than the otherwise would after flexing down from the hook attachment point. In an exemplary embodiment, the elongated retainer portion of the integral retainer is coiled in a spring like configuration. An integral retainer may comprise a coil shaped elongated retainer portion that may be made out of plastic of metal This coiled elongated retainer portion may be used without any additional retainers or enlarged portions along the length of the coiled elongated retainer as the coiled configuration may provide sufficient durability and retention of the integral retainer within the lure body. In another embodiment, the elongated retainer portion of the integral retainer may be planar in cross-sectional shape, having a width that is much greater than a thickness. The width of the planar elongated retainer portion extends across the lure, perpendicular from the tab and this planar geometry may enhance vertical movement especially of the ends of the lure.

A method of making a flexible plastic fishing having an integral retainer is provided herein. The method comprises the steps of: providing a moldable plastic; providing a fishing lure mold having a fishing lure body cavity; providing an integral retainer as described in any of the embodiments herein; heating the moldable plastic to a molding temperature, wherein said molding plastic is melted to a liquid moldable plastic; substantially filling the fishing lure mold with the liquid moldable plastic; and allowing the liquid moldable plastic to cool to create a flexible plastic fishing lure having an integral retainer.

In another embodiment, the method comprises a mold having a tab cavity configured to hold and retain an extension tab of the integral retainer, wherein an extension tab is configured within the tab cavity to retain the integral retainer in the mold cavity. In another embodiment, the method comprises a first tab cavity on a first side of the mold and a second mold cavity on a second side and opposing side of the mold, and the integral retainer comprises a first and a second extension tab configured to fit within the first and second tab cavities.

In one embodiment, the method comprises the step of injecting the liquid moldable plastic through the aperture of the integral retainer to substantially fill the fishing lure mold. As described herein, the integral retainer may be configured as the leading end of the flexible fishing lure and the aperture through the integral retainer may receive the liquid moldable plastic directly from the fill port.

The summary of the invention is provided as a general introduction to some of the embodiments of the invention, and is not Intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, a standard jig-head 50 comprises a head portion 51, an eyelet 52, a jig-body 54, a barb 56 and a hook shank 57 that terminates in a hook end 58. Note that jig-heads come in a wide variety of shapes and sizes and typically have at least one barb to help retain a flexible plastic fishing lure thereon.

As shown in FIG. 2, a prior art version of a flexible plastic fishing lure 11 is attached to a jig-head 50. The hook 58 is extending through the body of the lure body 12 and flexible fishing lure is pushed up over the barb 56. The flexible plastic typically tears and/or deforms over the barb when positioned as shown in FIG. 2.

As shown in FIG. 3, the prior art version of the flexible plastic fishing lure 11 shown in FIG. 2, has torn 59, 59' after being pulled back from the jig-head 50, as indicated by the large bold arrow. When a fish bites a lure, they often bite the tail and pull on the lure. This tension on the lure body results in the plastic lure being ripped along the hook and barb, as shown. The leading end 26 of the flexible fishing lure 21 is pulled back from the head portion 51 of the jig-head 50. The tear 59 is caused by the jig-head barb 56 and the tear 59' is caused by the shank of the hook 57 tearing the lure body 12.

Figures 4, 6:
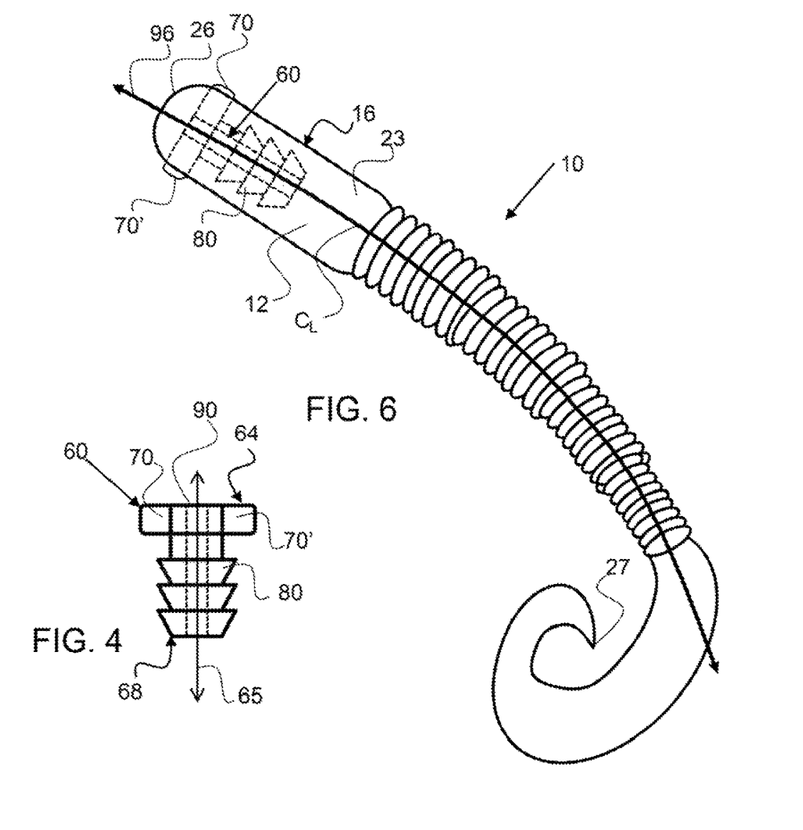
FIG. 4 shows a side view of an exemplary integral retainer having three retainer barbs configured along the length.
FIG. 6 shows exemplary flexible plastic fishing lure having an integral retainer, as shown in FIGS. 4 and 5, configured within the flexible plastic fishing lure.
Figure 5:
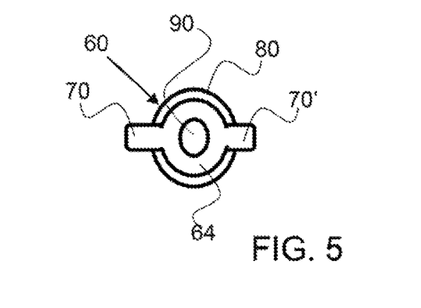
FIG. 5 shows a front-end view of the exemplary integral retainer shown in FIG. 4.

As shown in FIGS. 4 and 5, an exemplary integral retainer 60 has three retainer barbs 80 configured along the length. The integral retainer has two extension tabs 70, 70' as best shown in FIG. 5. The integral retainer has an aperture 90 that extends from the front surface 64 of the front end, to the back surface 68 of the back end.

As shown in FIG. 6, the exemplary flexible plastic fishing lure 10 has a length axis 96 extending along a centerline, $C_L$, of the fishing lure and an integral retainer 60, as shown in FIGS. 4 and 5, configured within the lure body 12. The retainer barbs 80 maintain the body 12 of the lure to the integral retainer 60. The extension tabs 70, 70' extend out from the outside surface 16 of the lure body and thereby indicates to a user that the flexible fishing lure has an integral retainer. The length of the flexible fishing lure 21 is the distance from the leading end 26 to the trailing end 27 of the curly tail worm 23 type lure.

Figure 7:
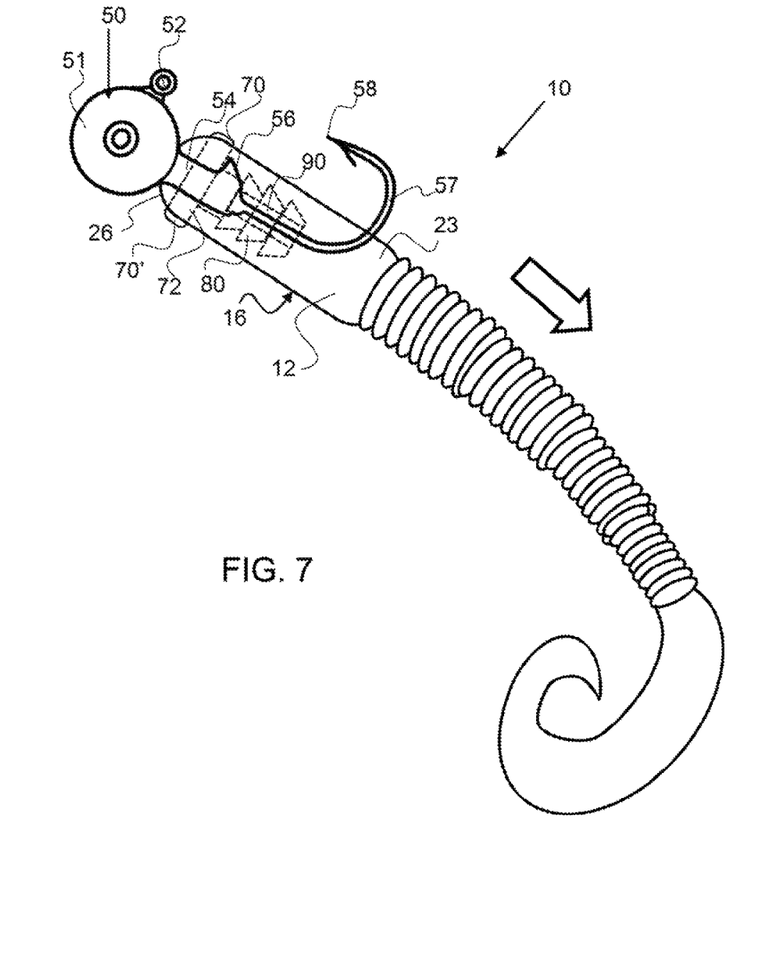
FIG. 7 shows a side view of the exemplary flexible plastic fishing lure, shown in FIG. 6, attached to a jig-head.

As shown in FIG. 7, the exemplary flexible plastic fishing lure 10, shown in FIG. 6, is attached to a jig-head 50. The hook end 58 and shank 57 have been inserted through the aperture 90, and subsequently through the lure body 12. The leading end 26 of the lure body 12 has been pushed up against the head portion 51 of the jig-head 50. The jig-head barb 56 is retained by a front enlarged portion of the integral retainer. The leading end of the fishing lure 10 is pushed up against the head portion 51 of the jig-head 50, and the retainer barbs retain the body 12 of the lure to the integral retainer and thereby prevent the flexible plastic fishing lure having an integral retainer from slipping back from the head portion 51.

Figure 8:
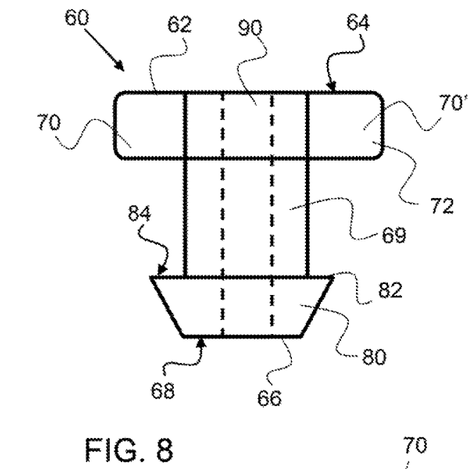
FIG. 8 shows a side view of an exemplary integral retainer having a single retainer barb.

As shown in FIG. 8, an exemplary integral retainer 60 has a single retainer barb 80. A retainer extension 69 extends from the front portion 72 of the integral retainer to the retainer barb 80. The retainer extension in this embodiment in cylindrical in shape. The front portion may be larger in radial dimension than the retainer extension, and thereby provide a stop for the barb on a jig-head. A front portion 72 may be disc or cylindrical in shape having an aperture 90 therethrough. The integral retainer 60 has a front-end 62 having a front surface 64 and a back-end 66 having a back surface 68. The retainer barb 80 has an enlarged portion 82 and a barb-retainer surface 84 that extends out radially from the retainer extension 69. The retainer barb truncates down in radial dimension from the barb-retainer surface. The barb-retainer surface prevents the flexible fishing lure from sliding back, as it presents a flat surface to resist and prevent sliding.

Figure 9:
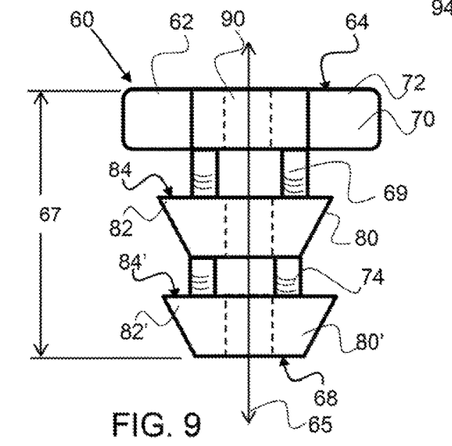
FIG. 9 shows a side view of an exemplary integral retainer having two retainer barbs configured along the length of the retainer.

As shown in FIG. 9, an exemplary integral retainer 60 has two retainer barbs 80, 80' configured along the length 67 of the integral retainer. The retainer bars extend out from the length axis 65 of the integral retainer to form enlarged portions of the integral retainer 60. The integral retainer comprises a retainer extension 69 from a front portion of the integral retainer to the first retainer barb 80. The integral retainer also comprises an extension portion 74 between the truncated end of the first retainer barb 80 and the enlarged portion 82' of the second retainer barb 80'. The retainer extension 69 and extension portion 74 are two posts. Note that any number of posts may be configured as retainer extensions and/or extension portions. Posts may be more preferred over cylindrical shapes as it may provide more room for the barb of the jig-head to seat within the integral retainer.

Figure 10:
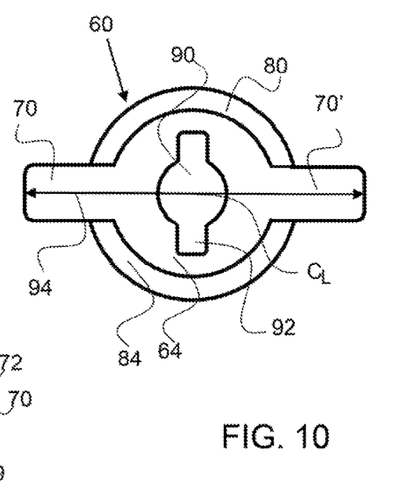
FIG. 10 show a front-end view of the exemplary integral retainer shown in FIG. 9A having a barb-slot that extends from the aperture.

As shown in FIG. 10, the exemplary integral retainer 60 shown in FIG. 9 has a barb-slot 92 that extends from the aperture 90. The barb-slot may be configured to align with a jig-head bard and thereby provide easier assembly of the flexible fishing lure on the jig-head. In an exemplary embodiment, the integral retainer is configured with a front surface that forms the leading end of the flexible fishing lure and therefore enables a user to align the jig-head barb with a barb-slot. The extension tabs 70, 70' as well as the barb slot 92 extend radially from a center line of the integral retainer.

Figure 11:
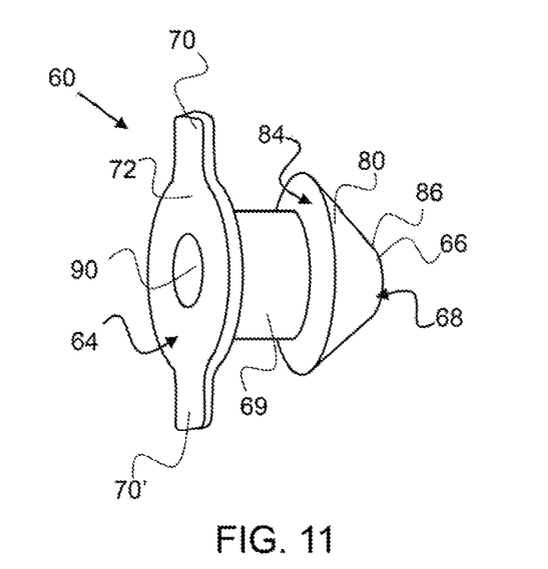
FIG. 11 shows a perspective view of an exemplary integral retainer.

As shown in FIG. 11, an exemplary integral retainer 60 comprises a front portion 72 that is enlarged in radial dimension over a retainer extension 69. The retainer barb 80 has a flat barb-retainer surface 84 that is larger in radial dimension than the truncated end 86, or back end 66 of the integral retainer, in this embodiment. The aperture 90 extends completely through the integral retainer and two extension tabs 70, 70' extend in opposing direction from the front portion.

Figure 12:
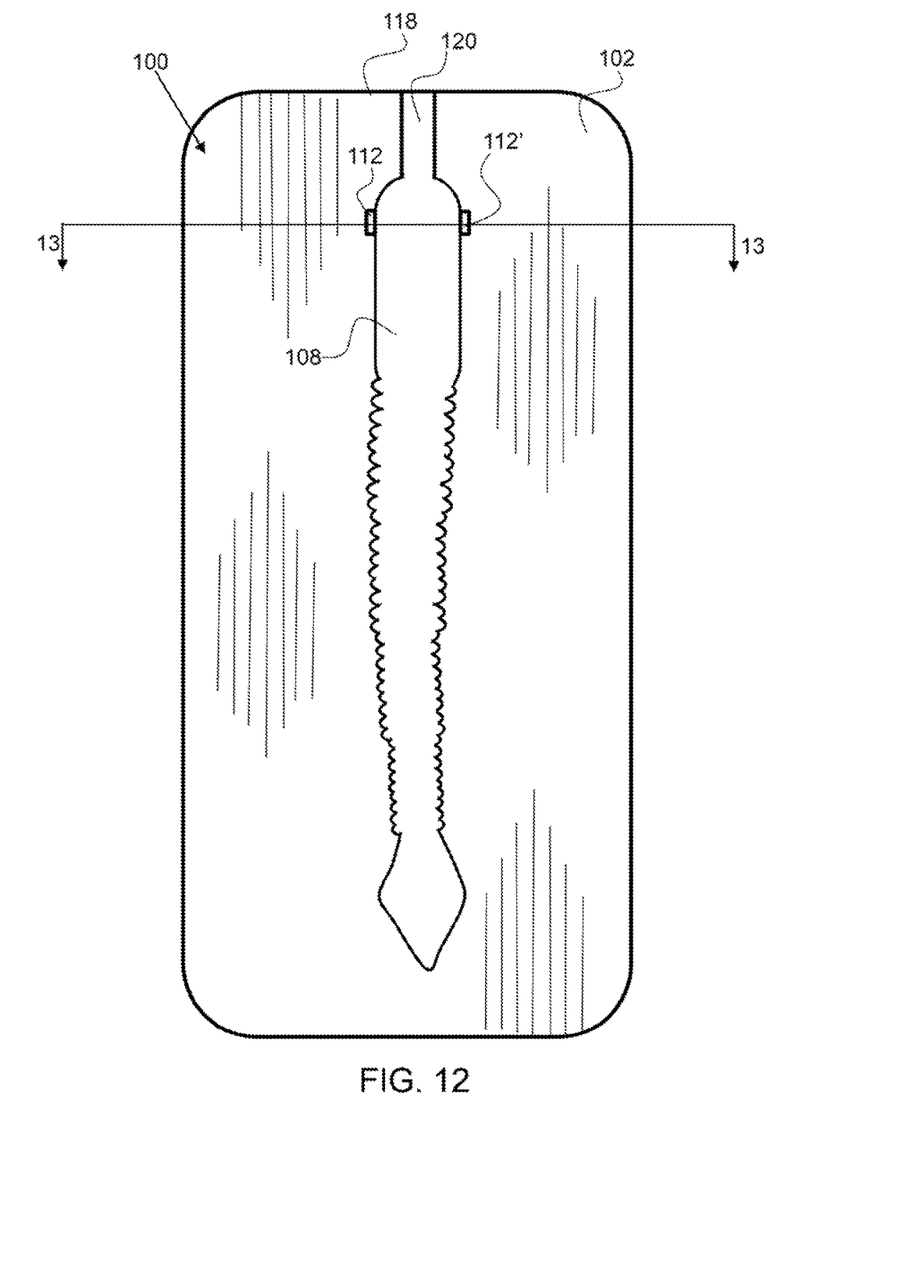
FIG. 12 show a top down view of one portion of an exemplary fishing lure mold having a mold cavity in the shape of a worm and a fill port.

As shown in FIG. 12, an exemplary first mold portion 102, of a fishing lure mold 100 has a lure body cavity 108 in the shape of a worm and a fill port 120. The mold also comprises tab cavities 112, 112' for receiving and retaining the extension tabs. In an exemplary embodiment, the extension tabs retain the integral retainer within the mold cavity such that only the extension tabs contact the mold cavity and the rest of the integral retainer is suspended within the mold cavity and does not contact the mold cavity surface. In this way, the melted and liquid plastic can flow around the outer surface of the integral retainer and produce a flexible plastic fishing lure that is substantially within the lure body, wherein only the extension tabs extend out from the exterior surface of the lure body.

Figure 13:
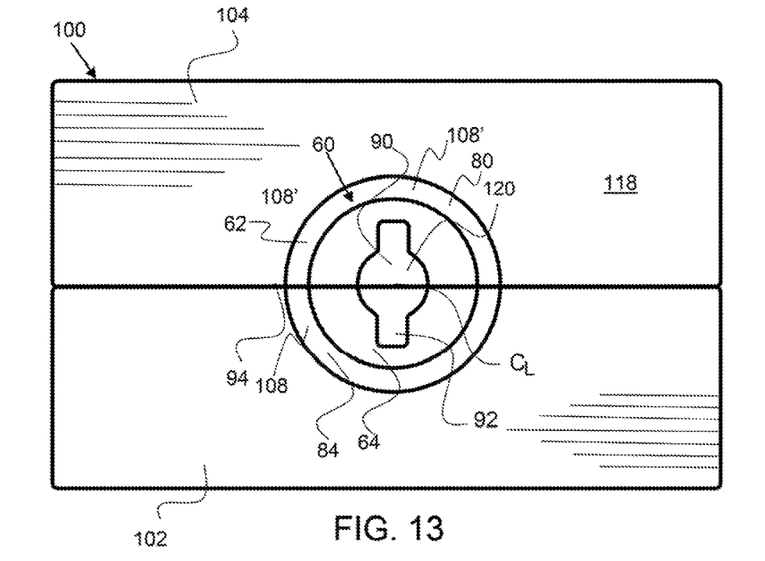
FIG. 13 shows a fill end view of a fishing lure mold as generally shown in FIG. 12 with an integral retainer configured therein.

As shown in FIG. 13, an exemplary fishing lure mold has a second mold portion 104 configured over the first mold portion 102. The lure body cavity 108, 108' in the first and second mold portions 102, 104, respectively, form a substantially circular cavity. The integral retainer 60 has a front end 62 that extends to the fill end 118 or face of the mold. The mold can be filled through the aperture 90 that extends down through the integral retainer.

Figure 14:
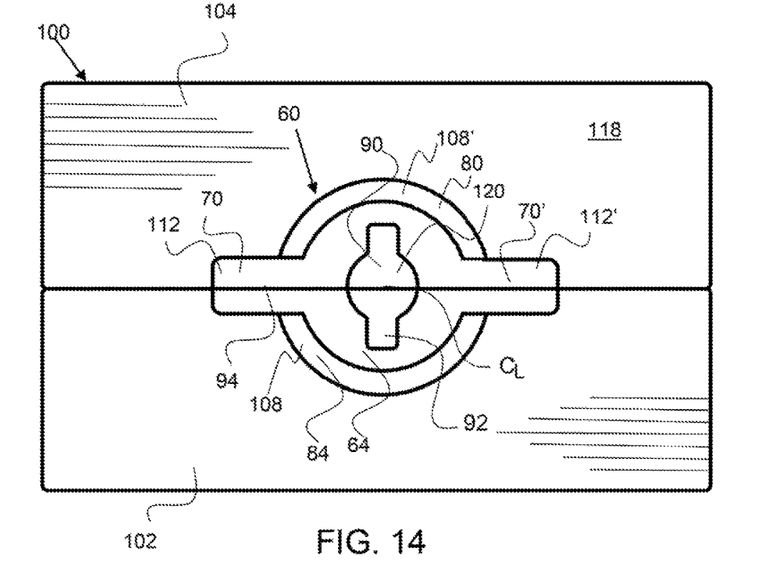
FIG. 14 shows a cross-sectional view of a fishing lure mold as generally shown in FIG. 12 along line 13-13 with an integral retainer configure therein.

As shown in FIG. 14, the integral retainer 60 is retained in position within the mold 100 by the extension tabs 70, 70' configured within the tab cavities, 112, 112' respectively. Each of the mold portions comprises a portion of the tab cavity. It is to be understood that a tab cavity may be formed in only one portion of the mold, completely within the first mold portion 102 or second mold portion 104.

Figure 15:
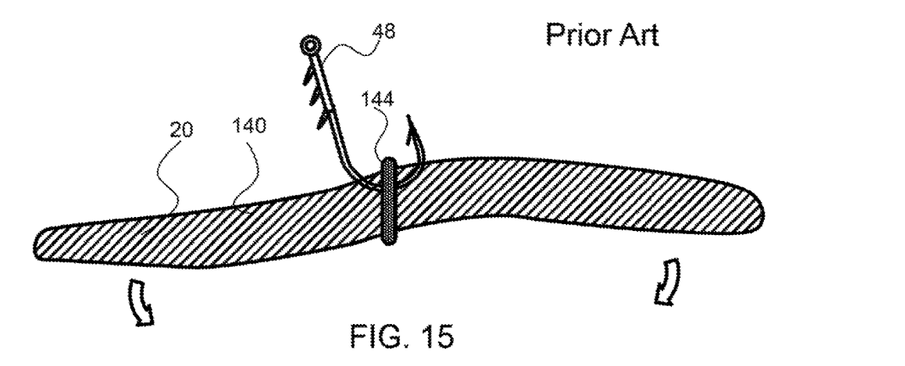
FIGS. 15 and 16 show prior art fishing lures comprising a plastic worm having a ring configured around the body for securing a hook thereto.
Figure 16:
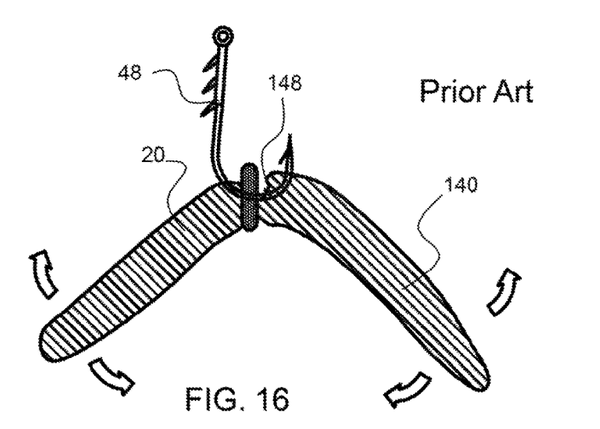

FIGS. 15 and 16 show prior art fishing lures comprising a plastic worm 140 having a ring 144, such as an O-ring, configured around the body 20 of the worm for securing a hook 48 thereto. This type of fishing lure enables flexing of both extended ends of the worm body about the attachment point of the hook. A ring is placed over the body of the worm using a tool that expands the ring to allow it to be placed over body of the plastic worm. The user then slides the ring off and onto the worm. The ring is typically smaller in inner diameter than the worm and constricts the body of the worm. This leads to rips 148 during use. This conventional lure is difficult to assemble and has limited durability as the ring can create a high stress point that results rips and tears, as shown in FIG. 16.

Figure 17:
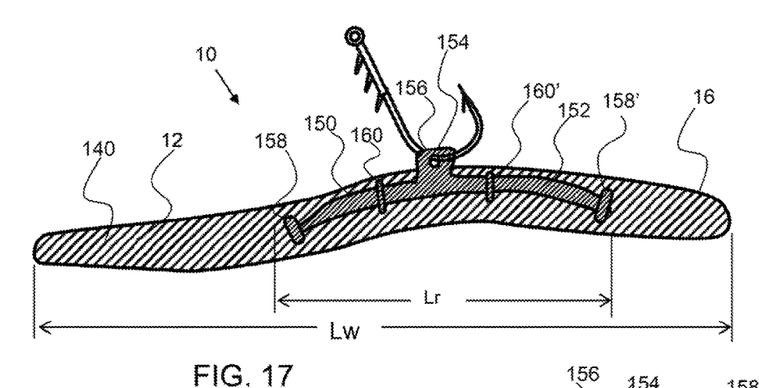
FIG. 17 shows an exemplary fishing lure of the present invention having an integral retainer configured within the body portion and a tap extending out from the body for attachment of a hook.

As shown in FIG. 17, an exemplary fishing lure 10 has an integral retainer 150 configured within the body 12 portion and a tab 154 extending out from the outside surface 16 of the plastic worm, for attachment of a hook 48. The tab 154 has an aperture 156 for hook attachment. The integral retainer has an elongated retainer portion 152 extending along the length of the lure. The length of the elongated retainer portion Lr, from a first end to a second end, may be any suitable portion of the length of the lure body Lw. The tab may be substantially centrally located along the length of the elongated retainer portion, as shown. The integral retainer may have one or more enlarged retainers along the elongated retainer portion, such as the two end retainers 158, 158' that are configured on the first and second ends, as well as enlarged portions between the tab and the extended ends, such as retainers 160, 160'. The integral retainer will enable flexing of either end of the lure body and will reinforce the lure body and prevent ripping. The tab allows for attachment of a hook, thereby preventing any punctures of the lure body.

Figures 18, 19, 20, 21, 22:
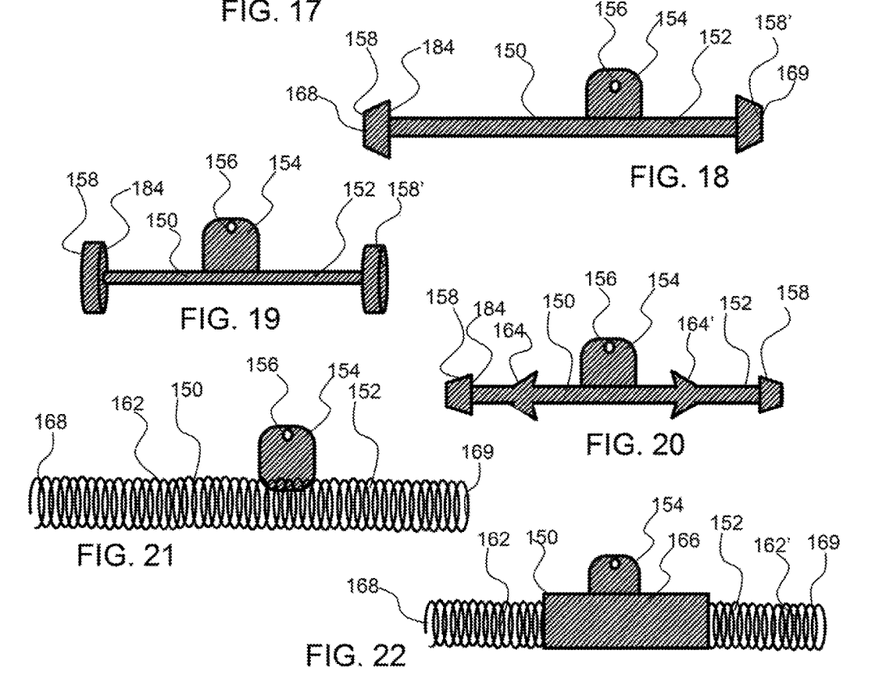
FIGS. 18 to 20 show exemplary integral retainer having tabs for hook attachment.
FIGS. 21 and 22 show an exemplary integral retainer comprising a coil along the elongated retainer portion.

As shown in FIGS. 18-20, exemplary integral retainers 150, have tabs for hook attachment of a hook. FIG. 18 shows an integral retainer that is asymmetric, having the tab offset from a substantially central location. FIG. 18 shows end retainers 158, 158' that are plug shaped, having a truncated diameter and a retainer surface 184, or surface the is perpendicular to the length of the lure. FIG. 19 shows an integral retainer 150 that has disc shaped end retainers 158, 158'. FIG. 20 shows an integral retainer that has barb shaped retainers 164, 164' along the length of the elongated retainer portion 152. The end retainers in FIG. 20 are plug shaped.

As shown in FIGS. 21 and 22, a portion of the elongated retainer portion 152 may be a coil 162. As shown in FIG. 21, the elongated retainer portion is a coil that extends from a first to second end of the elongated retainer portion. As shown in FIG. 22, a coil extends from a central portion 166. A central portion may have two separate coils 162, 162' extending therefrom to form the elongated retainer portion, or a central portion may be a sleeve and a single coil may be configured within and extend out from either end of the sleeve to from the elongated retainer portion. The central portion may have the tab 154 attached thereto. An elongated retainer portion comprising a coil may have more "action", in that the ends of the lure body, wherein the ends may spring down and up more energetically from the spring action of the coil. The coil may not require any additional retainers as the coil may provide sufficient retention within the lure body. In addition, the tab may be offset from a central length of the fishing lure, as shown in FIG. 21, and the coil may extend out a longer distance toward a first end 168 than a second end 169 of the integral retainer, thereby making the first end of the lure have more action, or more spring action. In addition, an end retainer may be configured on the end of a coil 162 which may further enhance the "action" and bounce or spring of the ends of the lure to attract fish.

Figure 23:
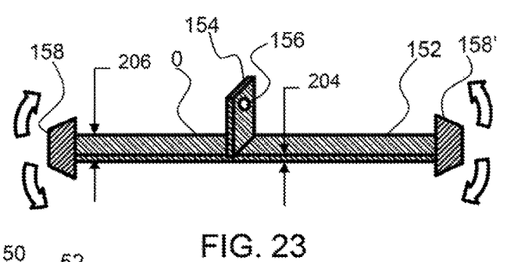
FIG. 23 shows an exemplary planar integral retainer.

As shown in FIG. 23, the elongated retainer portion is planar having a width 206 that is much greater than the thickness 204. This geometry of the elongated retainer portion may provide for more spring of the ends of a lure up and down, as indicated by the large curved arrows.

Figure 24:
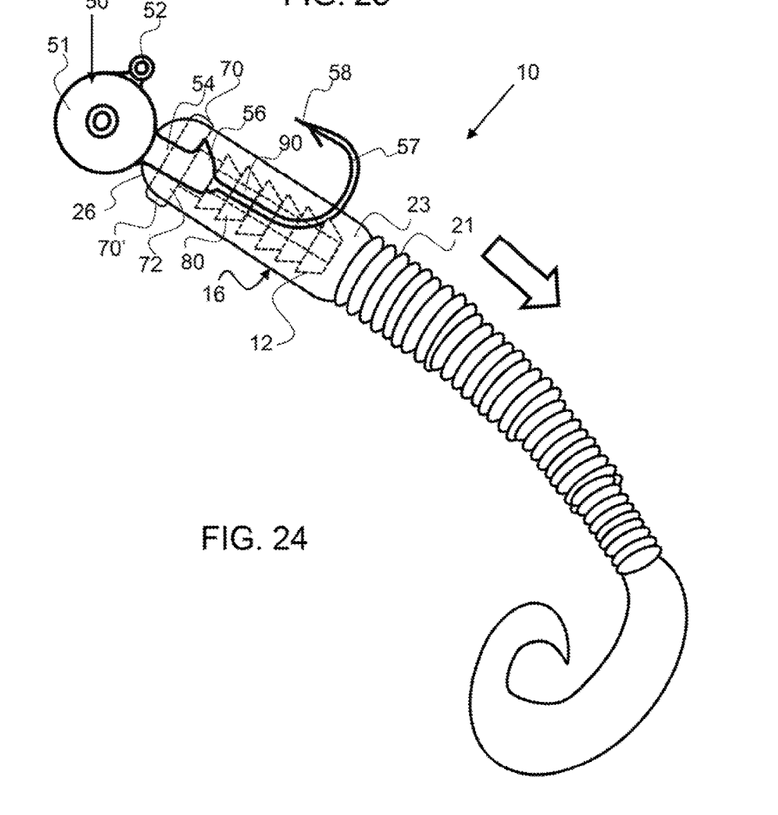
FIG. 24 shows a side view of the exemplary flexible plastic fishing lure, attached to a jig-head with the hook extending through the integral retainer.

As shown in FIG. 24, an exemplary flexible plastic fishing lure 10 has the hook 58 extending through the integral retainer 60. The hook shank 57 is extending from the aperture 90 of the integral retainer through the wall of the Integral retainer and then through the body 12 of the curly tail worm 23. This configuration will securely retain the jig head to the body 12 of the flexible fishing lure 21, and the body of the flexible fishing lure will be retained by the integral retainer.

An exemplary flexible plastic fishing lure may comprise a jig-head attached to the flexible lure body. A jig-head barb may extend through a slot and the lure body may be retained to the integral retainer.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A flexible plastic fishing lure comprising:
   a) a flexible body consisting essentially of plastic and comprising:
      i) an outer surface;
      ii) a leading end; and
      iii) a trailing end;
      iv) a lure length from the leading end to the trailing end;
   b) an integral retainer retained substantially within the outer surface of the flexible body and comprising:
      i) a front end having a front surface configured proximal to the leading end of the flexible body;
      ii) a back end having a back surface that is configured more proximal to the trailing end of the flexible body than the front end;
      iii) a length and length axis from said front end to said back end;
      iv) a retainer barb that extends out from the length axis to form an enlarged portion;
   v) an aperture that extends from the front surface of the front end, to the back surface of the back end;
   wherein said aperture is configured to receive a shank of a hook therethrough to detachably attach the hook to the flexible fishing lure; and wherein a barb on said hook extends through the aperture and is retained by the integral retainer.

2. The flexible fishing lure of claim 1, wherein the integral retainer is configured completely within the flexible body, wherein the integral retainer is completely within the outer surface of the flexible body.

3. The flexible fishing lure of claim 1, wherein only the front surface of the integral retainer extends out from the flexible body.

4. The flexible fishing lure of claim 1, wherein the integral retainer comprises an extension tab that extends at least to the outer surface of the flexible body.

5. The flexible fishing lure of claim 1, wherein the integral retainer comprises an extension tab that extends beyond the outer surface of the flexible body.

6. The flexible fishing lure of claim 1, wherein the integral retainer comprises a first and a second extension tab that extend beyond the outer surface of the flexible body on opposite sides of the flexible fishing lure.

7. The flexible fishing lure of claim 1, wherein the integral retainer comprises a retainer extension that extends from a front portion of the integral retainer to the retainer barb and wherein the retainer extension has an outer radial dimension that is less than an outer radial dimension of said retainer barb.

8. The flexible fishing lure of claim 1, wherein the integral retainer comprises a retainer extension that extends from a front portion of the integral retainer to the retainer barb and wherein the retainer extension is a post.

9. The flexible fishing lure of claim 1, wherein the integral retainer comprises a barb-slot that extends from the aperture wherein the barb-slot is configured to receive the barb of said hook therethrough.

10. The flexible fishing lure of claim 1, wherein the integral retainer comprises two or more retainer barbs configured along the length of the integral retainer.

11. The flexible fishing lure of claim 1, wherein the integral retainer is a one-piece unit made of single piece of material.

12. The flexible fishing lure of claim 1, wherein the flexible body is in a shape selected from the group consisting of: worm, crayfish, fish, eel, frog, and lizard; and wherein the length axis of the integral retainer extends along the length of the flexible body.

\* \* \* \* \*